United States Patent
Doty

(10) Patent No.: US 6,662,561 B1
(45) Date of Patent: Dec. 16, 2003

(54) MEANS TO DAMPEN THE EFFECT OF PRESSURE OSCILLATIONS ON A CONTROL VALVE

(75) Inventor: Gary L. Doty, Barrien Springs, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/210,457

(22) Filed: Jul. 30, 2002

(51) Int. Cl.[7] .............................................. B60T 13/00
(52) U.S. Cl. ........................................ 60/547.1; 60/566
(58) Field of Search .............................. 60/547.1, 553, 60/566, 590, 591, 592

(56) References Cited

U.S. PATENT DOCUMENTS

| | | | | |
|---|---|---|---|---|
| 3,220,190 A | * | 11/1965 | Schultz | 60/566 |
| 3,526,089 A | * | 9/1970 | Fulmer | 60/566 |
| 4,514,981 A | * | 5/1985 | Brown et al. | 60/547.1 |
| 4,656,923 A | * | 4/1987 | Tsuyuki et al. | 60/547.1 |
| 4,724,674 A | * | 2/1988 | Fulmer | 60/548 |

* cited by examiner

Primary Examiner—Thomas E. Lazo
(74) Attorney, Agent, or Firm—Leo H McCormick, Jr.; Warren Comstock

(57) ABSTRACT

A control valve (10) having a plunger (64) with a stem having a flange defined by a first diameter (66) loosely located in a first diameter (58) of a bearing (50) and a second diameter (68) sealingly located in a second diameter (56) of the bearing (50). A space between the flange and the bearing (50) defining a dampening chamber (82) such that on movement of plunger (64) toward an actuation chamber (54), fluid is drawing through a controlled flow path (x) into the dampening chamber (82). Under certain operational conditions, fluid pressure in the actuation chamber (54) maybe subjected to oscillation and the fluid in the dampening chamber (82) cancels the effect to the oscillation such that plunger (64) remains in a substantially stationary position corresponding to an input force applied thereto to effect a brake application.

5 Claims, 1 Drawing Sheet

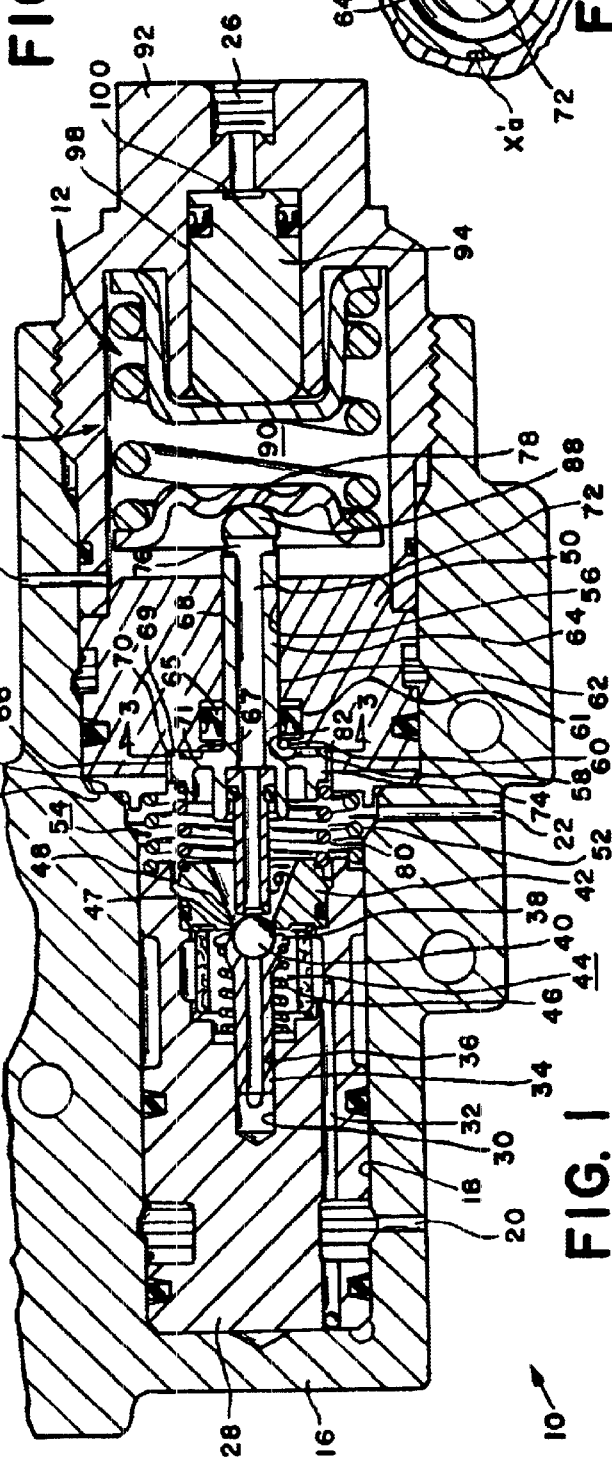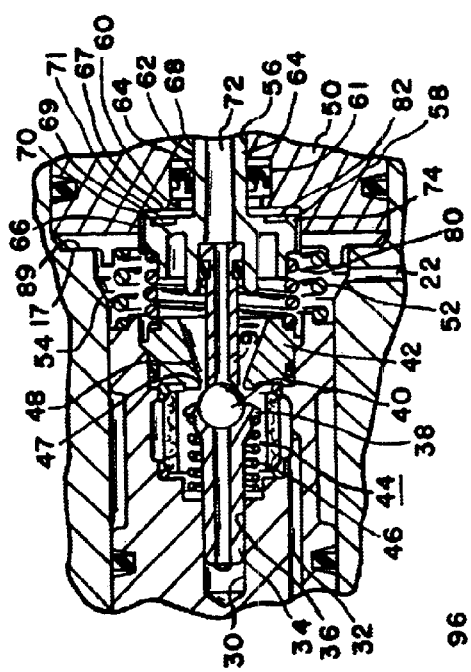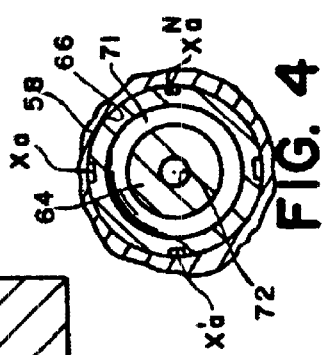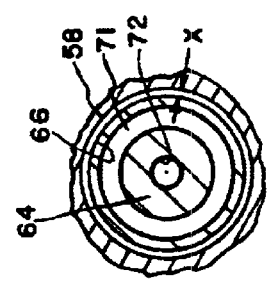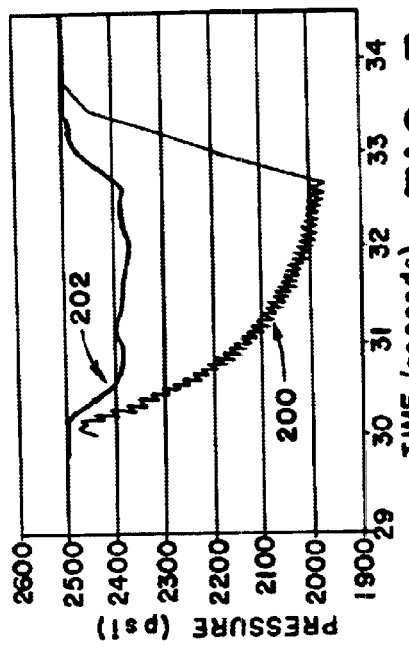

MEANS TO DAMPEN THE EFFECT OF PRESSURE OSCILLATIONS ON A CONTROL VALVE

This invention relates to a means through which an effect of oscillations in pressurized fluid in a brake system introduced during a skid control function are dampened and thereby do not substantially effect the level of pressurized fluid requested by the operation of a control valve in brake booster during a brake application.

BACKGROUND OF THE INVENTION

U.S. Pat. No. 4,514,981 discloses a hydraulic brake booster with a control valve that receives a manual input force from an operator to communicating pressurized fluid that acts on a piston and develops an output force to pressurize fluid in a control valve and effect a brake application. In this brake booster, the pressurized fluid is supplied by a pump and has a substantially constant fluid pressure. In this brake booster, a hollow stem extends from a plunger that is connected to the input rod. During a brake application, the hollow stem engages the ball on the valve member to terminate communication between an actuation chamber and a relief chamber. Once communication through the hollow stem is terminated, the ball is moved with respect to a seat and pressurized fluid is communicated to develop the output force. The pressure level of the pressurized fluid communicated to develop the output force is a substantially linear function of the input force applied to effect a brake application. Because of its simplicity and effective control of hydraulic fluid, this type control valve and adaptations thereof, have found many application in brake systems for vehicles including the brake system disclosed in U.S. patent application Ser. No. 10/159,160 filed May 30, 2002. In many vehicles having a hydraulic brake booster, additional features have been incorporated into a brake system such as skid control, traction control and sway control. These additional features are usually under the control of an Electronic Control Unit (ECU) that independently control the development of a brake application of individual wheel brakes based on a current operational condition under which the vehicle. In such brake systems, build and decay solenoid valves associated with each wheel brake are under the control of the ECU and activated to rapidly release and reapply fluid pressure to the wheel brake to maintain a safe operational condition for the vehicle. The skid control feature occurs during a brake application when the ECU determines that a wheel brake solenoid valve should be activated. During a skid control situation, oscillations may occur in the pressurized fluid supplied to the wheel brake at a frequency and duration such that the fluid pressure in the actuation chamber rises and drops rapidly. This oscillation is mirrored by the input plunger and reinforced by a return spring associated with an input plunger that urges the input plunger toward a rest position such that supply pressurized fluid is communicated to a relief chamber or reservoir even though the input force is applied to the input plunger requesting a brake application.

SUMMARY OF THE INVENTION

A primary object of the present invention is to provide a control valve for a brake booster in a vehicle with means to dampening an effect of oscillations in pressurized fluid supplied to effect a, brake application by retaining a plunger in a substantially stationary position corresponding to an input force applied to effect a brake application.

According to this invention, the control valve has first bearing member and a second bearing member located in a first axial bore of a housing. The first bearing member has a second axial bore connected to a source of pressurized hydraulic fluid. A stem located in the second axial bore has a ball retained on a first end. The ball is urged toward a seat surrounding an axial orifice in a cylindrical member that is connected to first bearing member by a first spring to define a supply chamber within the second axial bore. The supply chamber retains pressurized fluid from a source when the ball engages the seat on the cylindrical member. The axial orifice provides a flow path from the supply chamber to an actuation chamber formed between the first and second bearing members. The operational chamber is connected to the brake system that includes an ECU that can independently control the level of pressurized fluid utilized to effect a brake application of an individual wheel brake. The second bearing member has a third axial bore therein for retaining a plunger connected to an input member. The plunger has a flange on a first end located in the operational chamber and a spherical head on a second end that extends through the second bearing and into a relief chamber. The plunger has a passage that extends from the first end to a cross bore adjacent the second end while a tube extends from the first end of the plunger into the actuation chamber toward the cylindrical member. A second spring located in the operational chamber acts on the plunger to urge the flange toward and into engagement with the second bearing to establish a position of rest for the plunger. In the position of rest, the actuation chamber is in communication with the relief chamber by way of the tube, passage and cross bore. The input member includes an end cap fixed to the housing, a piston for receiving a hydraulic input and a linkage assembly for communicating an actuation force from the piston to the second end of the plunger. The actuation force acts on the second end of the plunger to initially move the tube into engagement with the ball. The engagement of the tube with the ball terminates communication from the operational chamber to the relief chamber and with further movement of the plunger, the ball is moved away from the seat to allow pressurized fluid from the supply chamber to flow into the actuation chamber for communication to the brake system to effect a brake application. The pressurized fluid in the actuation chamber may oscillate under certain operational condition caused by the introduction of skid control by the ECU. When such oscillations occur the second spring acts of the flange and may move the tube away from the ball such that pressurized fluid from the supply chamber is communicated to the relief chamber by way of said passage even though the input force remains applied to the second end of said plunger. The improvement provided by this invention resided in the plunger which is defined by a cylindrical body having a first diameter formed on the flange and located in a first diameter of the third axial bore and a second diameter that is sealingly located in a second diameter of the third axial bore. A space located between the first diameter of the plunger and the first diameter of the third bore in the second bearing member defines a dampening chamber. On initial movement of the plunger by an input force fluid is drawn into the dampening chamber and when pressurized fluid from the supply chamber is communicated into the actuation chamber additional fluid is communicated to the dampening chamber. Now should oscillations occur in the fluid pressure of the actuation chamber, fluid in the dampening chamber acts as a lock to retain the plunger in a substantially stationary position with the tube engaging the ball in accordance with the input force applied to the second end of the plunger to effect the brake application.

An advantage of this invention resides in a control valve wherein oscillation in fluid pressure caused by the introduction of a skid control feature into a brake system does not materially effect a request for the communication of pressurized fluid to effect a brake application as defined by an input force applied to a plunger.

A still further advantage of this invention resides in a relationship created between a plunger and a bearing to define a controlled hydraulic lock to maintain the plunger in a substantially stationary position corresponding to an input force for a duration of a brake application.

BRIEF DESCRIPTION OF THE DRAWINGS

FIG. 1 is a sectional illustration of a control valve for use in a brake booster of a brake system made according to the principles of the present invention;

FIG. 2 is an enlarged sectional view of a portion of the control valve of FIG. 1 during a brake application;

FIG. 3 is a sectional view taken along lines 3—3 of FIG. 2 showing the relationship between a bearing and plunger;

FIG. 4 is a sectional view of a secondary plunger for use in a bearing of FIG. 2; and FIG. 5 is a graph comparing the functional operation of a valve according to the present invention with a valve of the prior art when subjected to oscillations in pressure of fluid supplied to a brake system when an ECU has activated skid control to a wheel brake.

DETAILED DESCRIPTION

The hydraulic brake control valve 10 illustrated in FIG. 1 is designed to be used in a brake system of a vehicle having an ECU that receives inputs from various sensors to contribute in a safe operation of the vehicle. In particular, the ECU receives information relating to the wheel speed of each wheel, fluid pressure of the fluid available for effecting a brake application, road conditions, and etc for providing among other features a skid control function in the brake system such as disclosed in U.S. patent application Ser. No. 10/159,160 filed May 30, 2002. When an operator desires to effect a brake application, the operator applies a force to a brake pedal that pressurizes fluid in a master cylinder (not shown) and this pressurized fluid is supplied to an input assembly 12 of a remotely located brake booster 10 to activate a control valve and correspondingly supply pressurized fluid to the brake system.

In more particular detail, the hydraulic brake control valve 10 includes a housing 16 with a bore 18 therein. Bore 18 is connected to a source of pressurized fluid through port 20, to the brake system through port 22, to a reservoir through port 24 and to the master cylinder through port 26 in end cap 92. A first bearing member 28 retained in bore 18 has a stepped bore 30 that is connected to port 20 by a passage way 32. A stem 34 has a cylindrical body retained in a first diameter 36 of stepped bore 30 and an annular rib 38 on a first end that retains a ball 40. A cylindrical body 42 is sealingly located in bore 30 and with the first bearing member 28 defines a supply chamber 44 within bore 18. The supply chamber 44 is connected to port 20 by way of passage 32 to receive pressurized fluid from the source. A spring 46 located in axial bore 30 has a first end that engages bearing member 28 and a second end that acts on annular rib 38 to urge stem 34 toward cylindrical body 42 such that ball 40 is positioned on a seat 47 that surrounds axial orifice 48 in the cylindrical body 42. With ball 40 on seat 47, the pressurized fluid from the supply is retained in supply chamber 44.

A second bearing member 50 has a first end that engages a shoulder in bore 18 and defines a base for a spring 52 that urges the first bearing member 28 toward the end of bore 18. The spring 52 separates the first bearing member 28 from the second bearing member 50 to define an operational chamber 54 within bore 18 that is connected to port 22 of the brake system. The second bearing member 50 has an axial bore 56 with a first diameter 58, a second diameter 60 and a third diameter 62. A seal 65 is retained in a groove 61 located in the second diameter 60 while the third diameter 62 defines a bearing surface for axially aligning a plunger 64 with the axial orifice 48 in the cylindrical body 42.

Plunger 64 is defined by a cylindrical member having a first diameter surface 66 separated from a second diameter surface 68 by a shoulder 70. Plunger 64 has an axial bore 72 that extends from a first end 74 to a cross bore 76 adjacent a spherical head 88 on a second end 78. The first diameter surface 66 defines a flange that extends from the first end 74 to shoulder 70 on a face 69 that extends from the second diameter surface 68. The first end 74 has a guide that receives one end of a return spring 80 while the other end of the return spring 80 is located on cylindrical body 42. The return spring 80 urges the flange toward the second bearing member 50 such that a controlled flow path is defined by a difference "x", see FIG. 3, between the diameter 58 in the second bearing member 60 and the first diameter 66 of the flange. The face 69 has a groove 71 located thereon such that a dampening chamber 82 is created in a space between face 69 on plunger 64 and a face 67 between the first diameter 66 and second diameter 68 in the second bearing 50. The groove 71 is an important feature in that the development of surface tension or attraction between face 69 and face 67 is prevented and movement of plunger 64 with respect to the second bearing member 50 is not hampered. The spherical head 88 on plunger 64 extends through the second bearing member 50 is located in a relief chamber 90 in bore 18 that is connected to a reservoir by way of port 24 in housing 16.

The size of the operational chamber 54 for an individual application may vary. In order to utilize the hydraulic brake control valve 10 for many applications a tube 91 is attached to the first end 74 of the plunger 64 to extend the axial bore or passage 72 to a point adjacent the seat 47 on cylindrical body 42 for ball 40. The distance between the end of the tube 91 and ball 40 defines the travel required to move the plunger 64 from a position of rest and close communication between the brake system and reservoir before opening communication between the source of pressurized fluid from the supply to the brake system in effecting a brake application.

The second bearing member 50 is retained and positioned within bore 18 by the input assembly 12 that includes end cap 92, piston 94 and linkage assembly 96. End cap 92 is screwed into housing 16 to bring end 89 of the second bearing member 50 into engagement with shoulder 17 in bore 18 of housing 16 such that spring 52 urges the first bearing member 28 against the bottom of bore 18 and the various ports in housing 16 are aligned with the corresponding functional chambers, i.e. port 20 is connected with supply chamber 44; port 22 is connected with operational chamber 54 and port 24 is connected with relief chamber 90. Piston 94 is located in an axial bore 98 in end cap 92 and separates a chamber 100 formed in end cap 92 from relief chamber 90. Chamber 100 receives pressurized fluid representing the desired hydraulic input braking force from the master cylinder through port 26 while the relief chamber 90 in bore 18 is connected to a reservoir.

Mode of Operation

To effect a brake application using hydraulic brake booster 10, the operator applies an input force to a brake pedal and pressurizes fluid in a master cylinder to produce a desired hydraulic brake force that is supplied to chamber 100. This desired brake application represented by hydraulic pressurized fluid acts on piston 94 and develops an corresponding input force which after overcoming the force of return spring 80 moves piston 94 and plunger 64 toward ball 40. When the end of tube 91 engages ball 40, fluid communication is terminated from operational chamber 54 to relief chamber 90 by way of axial bore 72. Further movement of piston 94 by the input force causes ball 40 to be moved off seat 47 and now pressurized fluid can flow from the supply chamber 54 into the operational chamber 54 for distribution to the brake system by way of port 22 to effect the brake application as illustrated in FIG. 2.

During the initial movement of plunger 64 by the input force acting on piston 94, fluid is drawn into dampening chamber 82 by flowing along the flow path "x" defined by the space created by the difference between the diameter 58 in the second bearing member 50 and diameter 66 of the flange on plunger 64. Further as the plunger 64 thereafter moves to open the orifice 48 and allow pressurized fluid from the supply chamber 44 to be communicated into chamber 54, additional fluid is communicated into dampening chamber 82 as the fluid pressure in the dampening chamber 82 and operational chamber 54 equalize. The dampening chamber 58 is essentially closed as the flow into and out of is defined by controlled flow path created by the difference "x" between the diameter of the bore 58 and flange 66 it functions as a modified hydraulic lock to retain fluid therein. With fluid in dampening chamber 82, the plunger 64 is essentially retained in a substantially stationary position within the second bearing member 50 defined by the hydraulic force applied to piston 94 to effect a brake application.;

When the operator terminates the input force on the brake pedal, the pressurized fluid supplied to port 26 to develop the hydraulic force in chamber 100 terminates. With the termination of the hydraulic force, return spring 80 moves the plunger 64 toward the relief chamber 90 such that the end of tube 91 moves away from ball 40 to open communication between the operational chamber 54 and the relief chamber 90 by way of axial bore 72. The movement of plunger 64 toward the relief chamber 90 is controlled by the flow of fluid from the dampening chamber 82. The spring force acts on the flange and pushes fluid out along the flow path defined by dimension "x" until face 89 engages face 67 to define a rest position for plunger 64 as illustrated in FIG. 1.

The flow path for fluid between the operational chamber 54 and dampening chamber 82 is controlled by the space defined by dimension "x" and can be varied to speed up or slow down the effect of the modified hydraulic lock. For some applications the flow path may need to be increased to achieve a faster response time in the development and release of the hydraulic lock. In order to achieve an increase in the size of the flow path, the plunger 64 may be modified through the addition of a plurality of axial slots $X_a, X_a', \ldots X_a^n$ that are placed in the in the first diameter 66 of the flange as shown in FIG. 4. The axial slots may be in addition to or in conjunction with the flow path defined by dimension "x" depending on the desired operational time.

In order to test the effectiveness of control valve 10 in a brake booster for a brake system under operating conditions experienced when oscillations are introduced through a skid control feature by an ECU, the function of control valve 10 was evaluated with a control valve of the type disclosed in U.S. patent application Ser. No. 10/159,160.

In each of the control valves a pressurized fluid was supplied to act on piston 94 to develop an input force that moves the plunger 64 to move ball 40 away from seat 47 and allow pressurized fluid to be communicated from the supply chamber 44 into the operational chamber 54 for distribution to the brake system through port 22. Operating conditions of a skid control feature wherein build and decay solenoids under the control of an ECU release and retain pressurized fluid at an individual wheel cause oscillations in the fluid pressure at 250 Hz. The fluid pressure in the supply chamber 44 was measured and as the introduction of the oscillation in the fluid pressure in the prior art control valve causes the end of the tube on the plunger 64 to separate from the ball 40 and allow fluid to flow from the supply chamber 44 to the relief chamber 90 by way of axial bore 72 even though the input force on plunger 64 remained constant and as a result the available fluid pressure decreases. Trace 200 in FIG. 5 illustrates an average change for a control valve of the prior art in the supply fluid pressure during a brake application with the introduction of a skid control function. Trace 202 in FIG. 5 illustrates the operation of the brake booster 10 under the same operating conditions as the prior art brake booster. In brake booster the plunger 64 retained in a substantially constant position by ,the fluid retained in dampening chamber 82 and as a result the end of tube 91 and ball 40 remain in contact such that fluid pressure of the fluid in the supply chamber 44 remains substantially constant.

I claim:

1. A control valve in a brake booster that supplies pressurized fluid to a brake system, said control valve having first bearing member and a second bearing member located in a first axial bore of a housing, said first bearing member having a second axial bore connected to a source of pressurized hydraulic fluid, a stem located in said second axial bore and having a ball retained on a first end; a cylindrical member connected to first bearing member to define a supply chamber within said second axial bore for receiving fluid from said source; said cylindrical member having a seat surrounding an axial orifice therein, a first spring located in said supply chamber for urging said ball toward said cylindrical member and into engagement with said seat to closed said supply chamber and retain fluid therein; said second bearing member being separated from said first bearing member to define an operational chamber within said first axial bore that is connected to said brake system, said second bearing member having a third axial bore therein, a plunger located in said third axial bore having a flange on a first end located in said operational chamber and a spherical head on a second end that extends into a relief chamber, said plunger having a passage that extends from said first end to a cross bore adjacent said second end; a tube extending from said first end of said plunger; a second spring located in said operational chamber and acting on said plunger to urge said flange into engagement with said second bearing to establish a position of rest for said plunger wherein said actuation chamber wherein said actuation chamber is in communication with said relief chamber by way of said passage and cross bore; an actuation assembly fixed to said housing including linkage assembly connected to said second end of said plunger for moving said tube into engagement with said ball in response to an input force being communicated from an operator to effect a brake application, said plunger initially moving to terminate communication from said operational chamber to said relief chamber and thereafter moving said ball away from said seat to allow pressurized fluid from said supply chamber to flow into said actuation chamber that is communicated to said brake system to effect said brake application, said pressurized fluid in said actuation chamber under certain operational condition being subjected to an oscillation in the fluid pressure such that said second spring acts on said flange and moves said tube away from said ball such that pressurized fluid from said supply chamber is communicated to said relief chamber by way of said passage even though said input force remains applied to said second end of said plunger; the improvement wherein said plunger is defined by a cylindrical body having a first diameter defined by said flange and located in a first diameter of said third axial bore and a second diameter that is sealingly located in a second diameter of said third axial bore, a space between said first diameter of said plunger and said first diameter of said third bore in said second bearing member defining a dampening chamber such that on initial movement of said plunger by said input force fluid is drawn into said dampening chamber and when pressurized fluid from said supply chamber is communicated into said actuation chamber additional fluid is communicated to said dampening chamber such that if oscillation should occur in the fluid pressure of the said actuation chamber said fluid in said dampening chamber acts as a lock to retain said plunger in a substantially stationary position corresponding to said input force applied to said second end of said plunger.

2. The control valve as recited in claim 1 wherein said first diameter on said plunger and said first diameter in said second bearing define a space relationship that allows a controlled flow path for fluid between said actuation chamber and said dampening chamber.

3. The control valve as recited in claims 2 wherein said second spring on termination of said input force on said second end of said plunger acts on said plunger to force fluid through said controlled flow path from said dampening chamber and into said actuation chamber as said flange is moved toward said position of rest for said plunger.

4. The control valve as recited in claim 3 wherein said controlled flow path is further defined by a plurality of axial slots located in said first diameter on said flange to provide an additional flow path through which fluid is communication between said actuation chamber and said dampening chamber.

5. The control valve as recited in claim 4 wherein said actuation assembly includes an end cap that is secured to said housing, said end cap having a fourth axial bore therein for receiving a piston and a caged spring, said caged spring having a first end that engages said piston and a second end that engages said second end of said plunger, said input force acting on said piston and being transmitted through said caged spring to said second end of said plunger and after overcoming said second spring and moves said plunger to terminate communication from said actuation chamber to said relief chamber by way of said passage and thereafter moves said ball off said seat to allow communication of pressurized fluid from said supply chamber to said actuation chamber for effecting a brake application.

\* \* \* \* \*